Patented Nov. 17, 1936

2,061,185

UNITED STATES PATENT OFFICE 2,061,185

FREE FLOWING SULPHUR

John B. Ceccon, San Francisco, Calif., assignor to San Francisco Sulphur Company, a corporation of California No Drawing. Application March 12, 1935,
Serial No. 10,659

3 Claims. (Cl. 23—242)

This invention relates to the production of a very finely divided sulphur and to the protection thereof. For various presently known uses sulphur is desired in a finely divided form in which it is free flowing. This has heretofore been accomplished by incorporating mechanically materials which serve as diluents in the sulphur, as lime, bentonite, or magnesium carbonate, in amounts as high as 10% by volume and higher. This practice resulted in mixtures in which the percentage of sulphur was lowered by the diluent, a practice not entirely acceptable to the trade which desires as close to a 100% product as is practicable, usually at least 99.5%, because of ease in handling and for other reasons as higher toxicity.

As a result of extensive research I have found that it is possible to produce a form of sulphur which remains free flowing even though stored under such unfavorable conditions as in a damp atmosphere and under pressure. Briefly this sulphur is obtained by incorporating into the mass of sulphur, preferably when it is molten, a protecting material and thoroughly distributing the added material through the sulphur. The molten sulphur is then permitted to cool after which it is comminuted. The added material or materials do not exceed 0.5%, usually less, though as much as 1% can be used. However, the smallest percentage requisite to the end in view is usually best since then the final mass has a higher sulphur content.

Microscopic examination of sulphur produced in accordance with this invention reveals that it is microcrystalline. Ths microcrystalline sulphur remains such and crystal growth does not seem to occur to any determinable extent. In other words, it is in a form in which the crystals are aborted and intergrown, not oriented, while the whole mass is somewhat vesicular and has a very irregular cleavage. Heretofore, sulphur has been produced which apparently lacked any crystalline form but which, after a period of time, reverted to a true crystalline structure. This sulphur had a high percentage of carbon bisulphide insoluble fraction. Some finely divided sulphurs, initially free flowing to a degree, exhibited this same crystal growth phenomena upon standing.

As an explanation for what I have determined, I now believe, without limiting myself thereto, that the materials, I have found useful, control the inner kinetics of the solidifying fluid melts. Such control affects the formation and growth of crystal nuclei; in achieving the results I seek, this control acts by increasing the resistance to the forces tending to bring the particles into the arrangement characteristic of the crystal so that the sulphur is obtained in a condition closely approximating the colloidal state. In actual practice I find the sulphur has a crypto-crystalline form with a few individuals incompletely developed, interlocked and unoriented, surrounded by non-crystalline masses. This is a colloidal phenomena comparable to colloidal protection.

Without limiting myself thereto, I believe that the main action is one of inhibiting crystal growth and that any effect of temperature and cooling is only supplemental; when the cooling rate must be rapid it is an indication that the protector added to the sulphur does not possess the same order of crystal growth inhibiting power as a protector not requiring cooling of the mass at a rapid rate.

For many uses a very finely divided sulphur is desired. Heretofore, sulphur has only been ground so that 95% was smaller than 147 microns or 100 mesh. Such a sulphur contained little if any sulphur smaller than 5 microns. I have made a sulphur in which over 98% will pass a 300 mesh screen while 100% will pass a 200 mesh screen; this sulphur was over 99% pure and remained free flowing. If previous sulphurs were milled to attempt production of such fine material they were not free flowing, became lumpy on storage and milled with difficulty.

It is an object of the present invention to provide a very finely divided but nevertheless stable sulphur.

Another object of this invention is to provide a free flowing sulphur of high purity, over 99%.

Another object of the invention is to stabilize a form of sulphur so that it remains free flowing.

A further object is to provide a process for the production of stable but very finely comminuted sulphur and, as an adjunct, a free flowing stable comminuted sulphur.

The invention possesses other features and objects of advantage some of which, with the foregoing, will appear in the detailed instructions as to the present preferred form of the invention.

In practicing my invention I have taken a quantity of sulphur and heated it up to about 140° C. so that it was molten. The sulphur was preferably one of good quality initially so that it was ready for manufacture into a comminuted form. The material added is preferably incorporated slowly with the sulphur with stirring so that little if any is vaporized or otherwise lost, since only a small volume is added. After the added material is incorporated, the sulphur is permitted to cool at the desired rate. It is then comminuted, at a desired temperature, usually by grinding, until it is finely divided. The sulphur of my invention can be ground very fine and I have made sulphur, over 99% pure, in which better than 98% was smaller than 300 mesh and 100% was smaller than 200 mesh. This remained free flowing and milled with ease. This proportion 2% larger than 300 mesh and 98% smaller is an excellent one for the material is quite free flowing.

Instead of adding the material to the molten sulphur it can be melted up with the sulphur. However, I deem this less desirable since some of the added material, a small quantity at the outset, is apt to be lost mechanically or by vaporization. Because of this last reason also I prefer that the material added if liquid be one that has a boiling point somewhat above or close to that temperature of the molten sulphur when the material is added or, if solid, has a melting point close to the melting point of sulphur, for otherwise vaporization losses are too high and too uncertain. The material can be added hot or cold.

As suitable materials I have used iodine, aniline, benzoyl, chloride, quinoline, iso-quinoline and naphthenic acids. In some cases, the use of two or more of these also give excellent results, frequently better than either alone. Thus I have combined and used successfully quinoline—benzoyl chloride, iso-quinoline—benzoyl chloride, benzoyl chloride—iodine as well as other combinations including those with iodine, pine oil and aniline. The quantity added in any case did not exceed 1% and usually was less than 0.5% of the combined materials. The use of acid materials as benzoyl chloride with a base as quinoline gives a salt useful as a protector.

It is to be remarked that the protector apparently has little effect on the carbon disulphide insoluble fraction, at least within the contemplation of this invention. In fact my present information shows that the longer the sulphur stands after manufacture, the greater this percentage becomes although it never exceeds a few percent, usually not more than 1%; when just ground this fraction is generally much less than 1%. Apparently therefore there is little if any amorphous sulphur formed under the conditions existing in my process for this form of sulphur is largely insoluble. In practice most of my tests were conducted on ton batches of sulphur which were allowed to cool by standing under atmospheric conditions under control so that the mass would be at about atmospheric temperature (18° C.) after from two and a half to six days.

Using a standard grade of fine sulphur now on the market as a comparison, all sulphurs made by me with the foregoing materials showed an improved efficiency on test for adhesiveness, in several cases as much as 20%.

None of the sulphur was wettable with the exception of the quinoline—benzoyl chloride sulphur, which was quite wettable.

On test for packing during storage, tests show that all sulphurs including the aforementioned materials were better than sulphur alone, although some of the manufactured sulphurs were better than others. For example, on one test I found those batches which included iodine to be the best while others had packed slightly under the heavy load placed on them.

In some instances, when two or more materials are used as protectors, it is probable that a reaction product can be formed by them in the hot sulphur and that this product becomes the protector. In some cases the joint action of materials herein set forth, or of materials herein enumerated with others, is superior to the action alone of any one of the materials used. Also I wish to point out the likelihood of a reaction between the material added and the sulphur, the possibility of the formation of various sulphur compounds with the sulphur, including the sulphonic acids, which are useful as protectors.

Stabilization, as effected by my invention, is not to be confused with any prior art incorporation of oils such as olive oil, castor oil, linseed oil, paraffine and the like which I have tested and found unsuitable, giving results in no way comparable to those I attain unless olefines were cracked and reacted to form olefine polysulphides.

I wish to point out that several factors have entered into selection of materials specifically recited as protectors. These are: first, liquids or finely divided solids chosen because of ease in mixing with the sulphur. Mechanical mixing of two solids is either heterogeneous or too high in cost if homogeneity is to be secured. Substances which display a certain amount of solvent-solute action with sulphur or are miscible therewith are considered most suitable. To avoid vapor losses, materials of high boiling point are preferred.

Second, cost has to be considered, as well as sulphur purity. To be effective, less than 0.5% of the added material or materials should be required and a limit of ten cents per sack was arbitrarily set as the cost limit in my research.

Third, materials of a poisonous nature or harmful to life cannot be employed for obvious reasons.

Fourth, manufacturing requirements and safety require the use of a non-inflammable material.

These reasons only affect the practical phases of the problem, the economics and manufacturing; merely because a material is deemed too expensive today in initial cost or manufacturing cost to be of practical importance is no reflection on its protective power, which may be of a high order.

It is to be noted that all the compounds disclosed as examples of these classes I have found useful, with one or two exceptions, are organic compounds having a solvent or solute action with sulphur and are, more particularly, organic bases or compounds including nitrogen. The representatives mentioned are the best known and at present the cheapest of the vast numbers of related organic compounds and presently considered by me to be the preferred materials. However, I do not wish to be limited merely to these for, as I have indicated, many organic compounds having a solvent or solute action with sulphur are useful and show a crystal growth inhibiting power or a colloidal state promotor ability, although it may not be practical to use it for any one or more of the reasons I have enumerated. Such organic compounds I include in the term protector or protecting material.

It is to be noted that most of the materials I have found useful are nitrogen containing compounds and can be further classified as organic bases. As classes, these are useful as protectors on sulphur but I have not enumerated more because objection can be raised to their use on one or more of the foregoing practical considerations. Thus I omit bone oil, pyridine and other nitrogen bases which are useful but objectionable. If these consideration are waived, then the list of suitable materials can be readily extended by specific enumeration of all members of these broad classes to include other amines, amides, imides, hydrazides, hydrazones, cyanides, ammonia reaction products with aldehydes and ketones and other sub-classes of the organic bases.

The presence of materials which destroy the effectiveness of a promoter should be avoided. Some materials can react with or destroy a protector and it therefore may be necessary to resort to a multiple protection.

My research has disclosed that certain materials improve the milling of the sulphur, making the sulphur holocrystalline. These materials include B-naphthol and naphthalene. This last material gives a very coarse structure in which the crystals are visible to the eye. These act in the same direction as the sulphur melt by assisting instead of hindering crystallization so that crystals of almost any size can be secured, perfectly developed and extremely hard and brittle.

I claim:

1. A comminuted free flowing stable dry sulphur containing about 1% of admixed iodine.

2. A comminuted free flowing stable dry sulphur containing about 1% of admixed iodine, said sulphur being reduced in size to be substantially all less than 200 mesh.

3. A comminuted free flowing stable dry sulphur containing about 1% of admixed iodine, said sulphur being reduced in size to be substantially all less than 200 mesh and with 98% passing a 300 mesh screen.

JOHN B. CECCON.